(12) United States Patent
Kim et al.

(10) Patent No.: US 12,474,592 B2
(45) Date of Patent: Nov. 18, 2025

(54) LIGHT PATH CONTROL DEVICE, DISPLAY DEVICE INCLUDING SAME, AND METHOD FOR MANUFACTURING LIGHT PATH CONTROL DEVICE

(71) Applicant: LG Display Co., Ltd., Seoul (KR)

(72) Inventors: Junehwan Kim, Paju-si (KR); Jungin Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 18/233,710

(22) Filed: Aug. 14, 2023

(65) Prior Publication Data

US 2024/0192517 A1     Jun. 13, 2024

(30) Foreign Application Priority Data

Dec. 12, 2022  (KR) .................. 10-2022-0172545

(51) Int. Cl.
    *G02B 27/28*  (2006.01)
    *G02B 5/22*   (2006.01)
    *G02B 5/30*   (2006.01)

(52) U.S. Cl.
    CPC ............ *G02B 27/288* (2013.01); *G02B 5/22* (2013.01); *G02B 5/3083* (2013.01)

(58) Field of Classification Search
    CPC ...... G02B 27/288; G02B 5/22; G02B 5/3083; G02B 5/3033; G02B 5/003; G02F 1/1323; G02F 1/133528; G02F 1/13363; G09F 9/30

USPC .................................................. 359/489.15
See application file for complete search history.

(56) References Cited

U.S. PATENT DOCUMENTS

| | | | |
|---|---|---|---|
| 2017/0031074 A1* | 2/2017 | Kong ............... | G02B 5/3025 |
| 2018/0355181 A1* | 12/2018 | Yoon ............... | G02B 5/3016 |
| 2019/0086712 A1* | 3/2019 | Ki ................... | G02F 1/13363 |
| 2019/0278119 A1* | 9/2019 | Wei .................. | G02F 1/1323 |
| 2021/0080782 A1* | 3/2021 | Wang ............... | G02F 1/133528 |
| 2021/0132422 A1* | 5/2021 | Kim ................. | G02F 1/133528 |
| 2022/0045132 A1* | 2/2022 | Lee .................. | G02B 5/201 |

FOREIGN PATENT DOCUMENTS

| | | |
|---|---|---|
| KR | 10-2013-0053976 A | 5/2013 |
| KR | 10-2021-0043149 A | 4/2021 |

* cited by examiner

*Primary Examiner* — William R Alexander
(74) *Attorney, Agent, or Firm* — Fenwick & West LLP

(57) ABSTRACT

A light path control device according to an embodiment includes a substrate; a first phase delay layer on the substrate that is configured to delay incident light by a first phase; a second phase delay layer on the first phase delay layer that is configured to delay incident light by a second phase that is different from the first phase; a viewing angle control layer that in direct contact with the second phase delay layer and configured to control a path of the incident light; and a polarization layer on the viewing angle control layer.

28 Claims, 15 Drawing Sheets

LIGHT PATH CONTROL DEVICE, DISPLAY DEVICE INCLUDING SAME, AND METHOD FOR MANUFACTURING LIGHT PATH CONTROL DEVICE

CROSS REFERENCE TO RELATED APPLICATION

The present application claims priority to Republic of Korea Patent Application No. 10-2022-0172545, filed Dec. 12, 2022, which is hereby incorporated by reference in its entirety.

BACKGROUND

Field of Technology

The disclosure relates a light path control device, a display device including the same, and a method for manufacturing a light path control device.

Description of the Related Art

A light-shielding film shields transmission of light from a light source, and is attached to a front surface of a display panel which is a display device used for a mobile phone, a notebook, a tablet personal computer (PC), a vehicle navigation device, a vehicle touch device, etc., so that the light-shielding film adjusts a viewing angle of light according to an incident angle of light to express a clear image quality at a viewing angle needed by a user when the display transmits an image.

In addition, the light-shielding film may be used for the window of a vehicle, building or the like to shield outside light partially to prevent glare, or to prevent the inside from being visible from the outside.

That is, the light-shielding film may be a light path conversion member that controls the movement path of light, blocks light in a specific direction, and transmits light in a specific direction. Accordingly, the transmission angle of light is controlled by the light-shielding film, so the user's viewing angle can be controlled. However, the light shielding film is thick thereby adding thickness to the display panel.

SUMMARY

An object to be achieved by the disclosure is to provide a light path control device in which a viewing angle control layer and a phase delay layer are integrated.

Another object to be achieved by the disclosure is to provide a method for manufacturing a light path control device in which a viewing angle control layer and a phase delay layer are integrated.

Still another object by the disclosure is to provide a display device including a light path control device in which a viewing angle control layer and a phase delay layer are integrated.

The technical object to be achieved by the disclosure is not limited to the above-mentioned technical object, and other technical objects not mentioned can be clearly understood by those skilled in the art from the description below.

In one embodiment, a light path control device comprises: a substrate; a first phase delay layer on the substrate, the first phase delay layer configured to delay incident light by a first phase; a second phase delay layer on the first phase delay layer, the second phase delay layer configured to delay incident light by a second phase that is different from the first phase; a viewing angle control layer that is in direct contact with the second phase delay layer, the viewing angle control layer configured to control a path of the incident light; and a polarization layer on the viewing angle control layer.

In one embodiment, a method for manufacturing a light path control device comprises: forming a light alignment polymer material layer on a substrate; forming a plurality of recessed grooves in the light alignment polymer material layer, the plurality of recessed grooves extending from a surface of the light alignment polymer material layer; forming a first phase delay layer that is directly on the substrate from the light alignment polymer material layer by irradiating a first light to a lower portion of the light alignment polymer material layer; forming a second phase delay layer that is directly on the first phase delay layer from the light alignment polymer material layer by irradiating a second light to a lower portion of the first phase delay layer; and disposing a light absorption pattern in the plurality of recessed grooves of the light alignment polymer material layer.

In one embodiment, a display device comprises: a display panel; and a light path control device on the display panel and configured to control the light from the display panel, the light path control device comprising: a substrate; a light alignment layer including a first portion that is on the substrate and a second portion that is directly on the first portion, the first portion configured to delay incident light by a first phase and the second portion configured to delay the incident light by a second phase that is different from the first phase; a viewing angle control layer on the second portion of the light alignment layer, the viewing angle control layer configured to control a path of the incident light, and a polarization layer on the viewing angle control layer.

Other details of embodiments are included in detailed descriptions and drawings.

According to the light path control device, the display device, and the method for manufacturing the light path control device according to embodiments, the viewing angle control layer and the phase delay layer may be integrated so that overall thickness thereof can be reduced.

The effects of the embodiments are not restricted to the one set forth herein, and more various effects are included in the specification.

DETAILED DESCRIPTION

Figure 1:
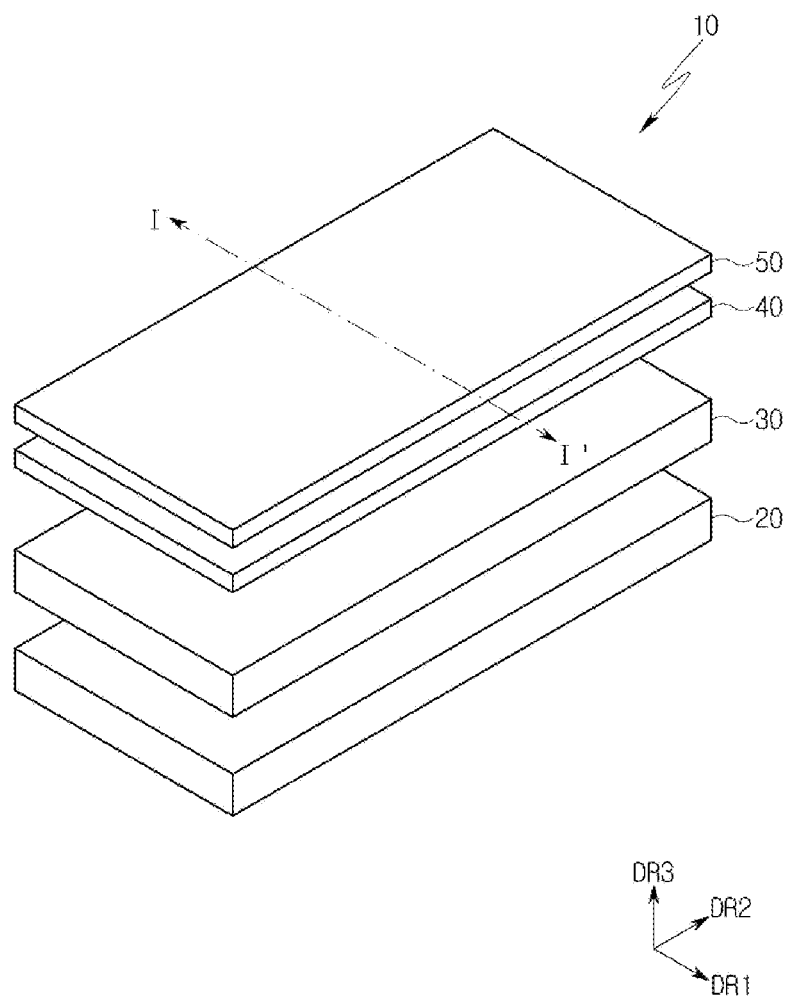
FIG. 1 is an exploded perspective view of a light path control device according to an embodiment.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Cases where elements or layers are referred to as being located "on" other elements or layers include all the cases where other layers or other elements are interposed directly on or between other elements. Same reference numerals refer to the same constituent elements throughout the specification. The shapes, sizes, ratios, angles, numbers, and the like, inscribed in the drawings to illustrate embodiments are illustrative only, and the disclosure is not limited to the illustrated in the drawings.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present invention.

Features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Exemplary embodiments will hereinafter be described in detail with reference to the accompanying drawings.

Figure 2:
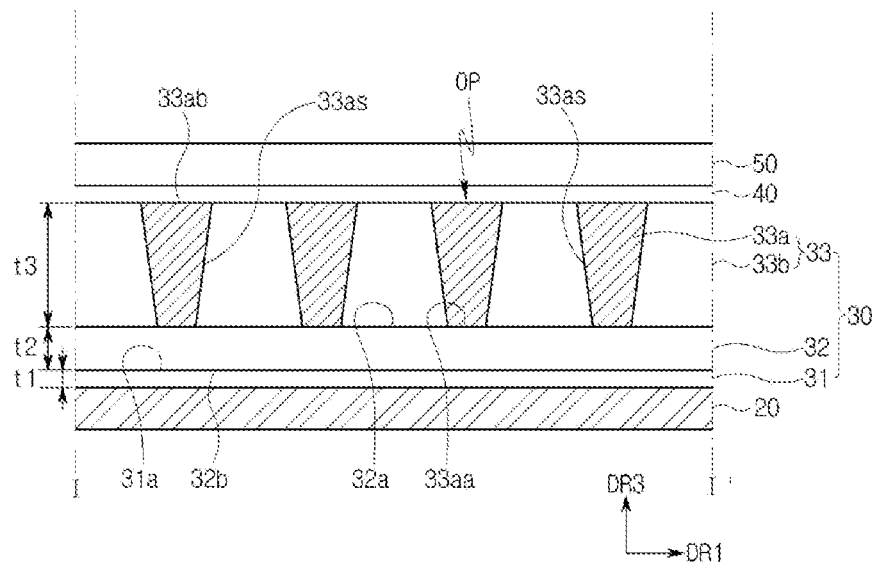
FIG. 2 is a cross-sectional view taken along the line I-I' in FIG. 1 according to an embodiment.
Figure 3:
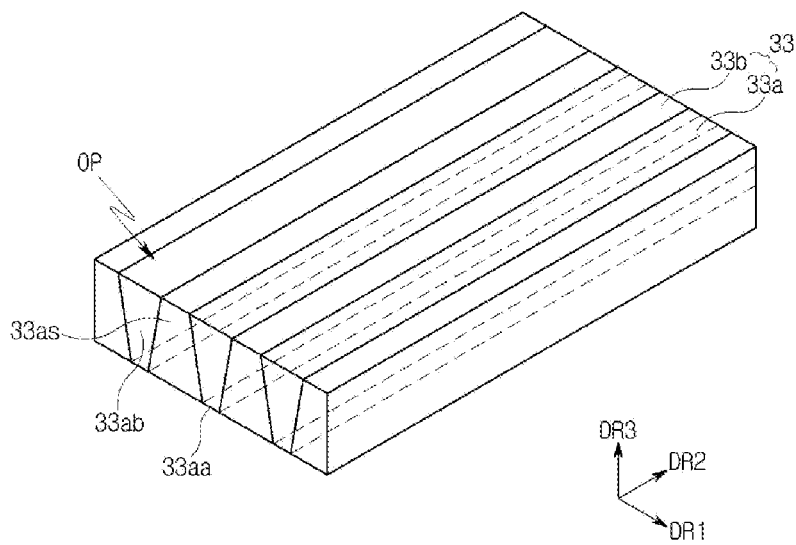
FIG. 3 is a perspective view of the viewing angle control layer of FIG. 1 according to an embodiment.
Figure 4:
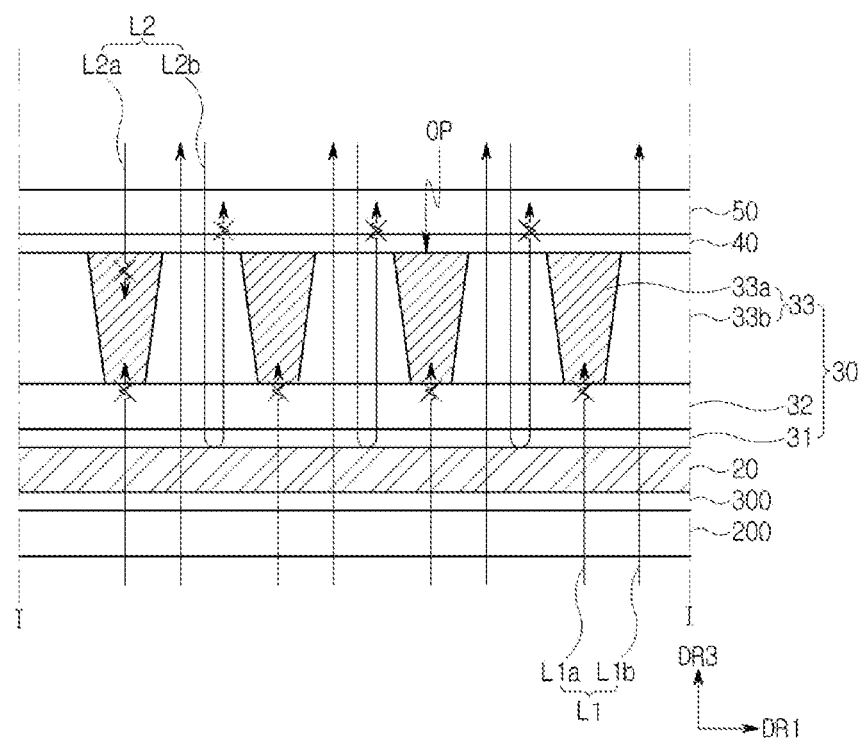
FIG. 4 is a schematic view illustrating a viewing angle control function and an outside light reflection prevention function of the light path control device of FIG. 2 according to an embodiment.

FIG. 1 is an exploded perspective view of a light path control device according to an embodiment. FIG. 2 is a cross-sectional view taken along the line I-I' in FIG. 1 according to an embodiment. FIG. 3 is a perspective view of the viewing angle control layer of FIG. 1 according to an embodiment. FIG. 4 is a schematic view illustrating a viewing angle control function and an outside light reflection prevention function of the light path control device of FIG. 2 according to an embodiment.

Referring to FIGS. 1 to 4, the light path control device 10 according to an embodiment includes a substrate 20, a light path control unit 30 on the substrate 20, a first coupling member 40 on the light path control unit 30, and a polarization layer 50 on the first coupling member 40.

The light path control device 10 may have a rectangular planar shape including short sides extending along a first direction DR1 and long sides extending along a second direction DR2. However, the planar shape of the light path control device 10 is not limited thereto and may be a square, circular, elliptical, or other polygonal shape. Hereinafter, for convenience of explanation, the light path control device 10 will be mainly described as having a rectangular planar shape.

The substrate 20 is a base substrate of the light path control device 10 and may be a light-transmitting substrate. The substrate 20 may be a rigid substrate including glass or tempered glass or a flexible substrate made of plastic. For example, the substrate 20 is a flexible polymer film, and may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI), and polystyrene (PS). However, the material of the substrate 20 is not limited thereto.

The light path control unit 30 may be disposed on the substrate 20. The light path control unit 30 may include a first phase delay layer 31 on the substrate 20, a second phase delay layer 32 on the first phase delay layer 31, and a viewing angle control layer 33 on the second phase delay layer 32.

The first phase delay layer 31 may delay incident light by a phase (e.g., a first phase) of ¼ wavelength ($\lambda/4$), and the second phase delay layer 32 may delay the incident light by a phase (e.g., a second phase) of ½ wavelength ($\lambda/2$). The first phase delay layer 31 may have a first thickness t1, and the second phase delay layer 32 may have a second thickness t2. The second thickness t2 may be greater than the first thickness t1. Although the embodiment is not limited thereto, the first thickness t1 may be about 2 μm, and the second thickness t2 may be about 4 μm.

The first phase delay layer 31 may be directly disposed on the substrate 20, and the second phase delay layer 32 may be directly disposed on the first phase delay layer 31. That is, the lower surface 32b of the second phase delay layer 32 may directly contact the upper surface 31a of the first phase delay layer 31.

The first phase delay layer 31 may include a light alignment polymer material. The first phase delay layer 31 may be a layer formed by irradiating and curing the light alignment polymer material using first light having a wavelength range of about 280 nm to about 320 nm to. Since the first phase delay layer 31 is formed by irradiating and curing the light alignment polymer material using first light having a wavelength range of about 280 nm to about 320 nm to the light alignment polymer material, it can be seen that the first phase delay layer 31 itself includes the light alignment polymer material.

The second phase delay layer 32 may include a light alignment polymer material. The second phase delay layer 32 may be a layer formed by irradiating and curing the light alignment polymer material using second light having a wavelength range of about 320 nm to about 400 nm. Since the second phase delay layer 32 is a layer formed by irradiating and curing the light alignment polymer material using second light having a wavelength range of about 320 nm to about 400 nm, it can be seen that the second phase delay layer 32 itself includes the light alignment polymer material.

That is, the light alignment polymer material included in the first phase delay layer 31 and the light alignment polymer material included in the second phase delay layer 32 have different alignment because the light irradiated to the light alignment polymer materials of the first phase delay layer 31 and the second phase delay layer 32 are different from each other. However, the materials constituting the phase delay layers 31 and 32 themselves may have the same molecular structure.

In some embodiments, transmittance of the light alignment polymer material layer of the first phase delay layer 31 for the first light before the light (first light and/or second light) is irradiated may be lower than transmittance of the light alignment polymer material layer of the second phase delay layer 32 for the second light before the light (first light and/or second light) is irradiated.

A viewing angle control layer 33 may be disposed on the second phase delay layer 32.

The viewing angle control layer 33 may control the viewing angle by controlling the path of light incident from the lower portion of the light path control device 10. For example, the viewing angle control layer 33 may be a vertical viewing angle control layer. A description thereof will be described later with reference to FIG. 3.

The viewing angle control layer 33 may have a third thickness t3. The third thickness t3 may be greater than each of the first thickness t1 and the second thickness t2. For example, the third thickness t3 may be about 80 μm, but is not limited thereto.

The viewing angle control layer 33 may include a light absorption pattern 33a that absorbs light and a light transmission portion 33b around the light absorption pattern 33a that transmits light. The light absorption pattern 33a and the light transmission portion 33b around the light absorption pattern 33a may each have the third thickness t3.

The light absorption pattern 33a may include a light absorption material that absorbs light. The light absorption material may include, but is not limited to, a material selected from black ink, black dye, and black pigment. As illustrated in FIG. 4, the light absorption pattern 33a absorbs the light (L1a of L1) incident from the bottom, and the light transmission portion 33b may transmit the light (L1b of L1) incident from the bottom upward. The light transmission portion 33b may include the light alignment polymer material. Transmittance of the light transmission portion 33b for visible light may be 90% or more.

As illustrated in FIG. 3, the light absorption pattern 33a may have a line shape extending along the second direction DR2 and may be provided in plurality. The light transmission portion 33b may be disposed on one side and the other side of the light absorption pattern 33a in the first direction DR1, respectively. The light transmission portion 33b may be disposed between adjacent light absorption patterns 33a.

As illustrated in FIGS. 3 and 4, the light absorption pattern 33a has a line shape extending along the second direction DR2, the light absorption pattern 33a absorbs the light (L1a of L1) incident from the bottom, and the light transmission portion 33b transmits the light incident from the bottom (L1b of L1) upward, so that among the light incident from the other side in the third direction DR3 to the viewing angle control layer 33, light except for the light overlapping the light absorption pattern 33a in the thickness direction is absorbed by the light absorption pattern 33a, and viewing angles of one side and the other side in the first direction DR1 may be controlled based on FIG. 3. In the case that the light path control device 10 according to an embodiment is applied to a vehicle, as described above, since the viewing angle control layer 33 controls the vertical viewing angle, there is an advantage in that it is possible to prevent an image emitted from a display panel, which will be described later, from being reflected on a window of a vehicle positioned above the display device including the light path control device 10.

As illustrated in FIG. 2, the upper surface 32a of the second phase delay layer 32 may directly contact the lower surface 33aa of the light absorption pattern 33a and the lower surface of the light transmission portion 33b, respectively.

The light absorption pattern 33a may include the lower surface 33aa, an upper surface 33ab facing (e.g., opposite) the lower surface 33aa, and a side surface 33as connecting the lower surface 33aa and the upper surface 33ab. The side surface 33as of the light absorption pattern 33a may directly contact the light transmission portion 33b. In FIG. 2, it is illustrated the width of the upper surface 33ab in the first direction DR1 is greater than the width of the lower surface 33aa in the first direction DR1, but is not limited thereto.

The light absorption pattern 33a may be understood as being disposed within an opening OP of the light transmission portion 33b. The opening OP of the light transmission portion 33b may completely penetrate from the upper surface of the light transmission portion 33b to the other side in the third direction DR3. The shape of the opening OP may be the same as that of the light absorption pattern 33a.

The light transmission portion 33b may include a light alignment polymer material. The light transmission portion 33b may be a layer formed by curing the light alignment polymer material. Since the light transmission portion 33b is formed by curing the light alignment polymer material, before curing, it can be seen that the light transmission portion 33b itself includes the light alignment polymer material.

That is, unlike the light alignment polymer material included in the first phase delay layer 31 and the light alignment polymer material included in the second phase delay layer 32, the light alignment polymer material of the light transmission portion 33b is not aligned because it is not irradiated with light. However, the molecular structure of the material itself constituting the light transmission portion 33b may be the same as that of the material constituting the phase delay layers 31 and 32.

A polarization layer 50 may be disposed on the viewing angle control layer 33. A first coupling member 40 may be disposed between the polarization layer 50 and the viewing angle control layer 33. The first coupling member 40 may include a light transparent adhesive (OCA) or a light transparent resin (OCR), or the like, but is not limited thereto.

The polarization layer 50 may be a linear polarization layer and may transmit light parallel to a light transmission axis. That is, among light passing through, light in a direction parallel to the polarization direction may be transmitted, and light in a vertical direction may be blocked.

The polarization layer 50 may have a linear polarization function by using a polarization film. The polarization layer 50 may include a polyvinyl alcohol (PVA) film. The polarization layer 50 may be manufactured by stretching a polyvinyl alcohol film in one direction and then adsorbing iodine (I) or a dichroic dye. The polarization layer 50 has an absorption axis in a stretching direction and a transmission axis in a direction perpendicular to the absorption axis. Among the light incident on the polarization layer 50, only linear polarization light is emitted in a direction parallel to the transmission axis. Tri-acetyl cellulose (TAC) films may be further included on the upper and lower surfaces of the polarization layer 50 to supplement durability so as to maintain mechanical strength, heat resistance and moisture resistance of the polarization film. The tri-acetyl cellulose (TAC) films preferably have non-optical properties so that the properties of light transmitted through the polarization film are not changed.

As illustrated in FIG. 4, among outside light L2, light L2a incident on the light absorption pattern 33a is absorbed by the light absorption pattern 33a, and the remaining outside light L2b may transmit through the polarization layer 50, the first coupling member 40, the light transmission portion 33b, the second phase delay layer 32, and the first phase delay layer 31. Only linear polarization light is emitted from the outside light L2 in a direction parallel to the transmission axis by the polarization layer 50, and the linear polarization light passes through the second and first phase delay layers 32 and 31 and reflected from the upper surface of the substrate 20, so that a polarization change is made and all of the light can be absorbed by the absorption axis of the polarization layer 50.

According to an embodiment, the polarization layer 50 and the phase delay layers 31 and 32 below the polarization 50 may be spaced apart with the viewing angle control layer 33 interposed therebetween. Furthermore, the first phase delay layer 31, the second phase delay layer 32, and the light transmission layer 33b may all be integrally formed.

That is, unlike the conventional method in which a polarization film (the first phase delay layer, the second phase delay layer, and the polarization layer) is attached to the viewing angle control layer as a separate coupling member, in the light path control device 10 according to an embodiment, the polarization layer 50 and the phase delay layers 31 and 32 below the polarization layer 50 are spaced apart with the viewing angle control layer 33 interposed therebetween, and the first phase delay layer 31 and the second phase delay layer 32 and the light transmission layer 33b are all integrally formed, so that the overall thickness of the light path control device 10 can be reduced and the process can be simplified.

Hereinafter, a method for manufacturing the light path control device 10 will be described.

FIGS. 5 to 11 are cross-sectional views for respective processes illustrating a method for manufacturing a light path control member according to an embodiment.

Figure 5:
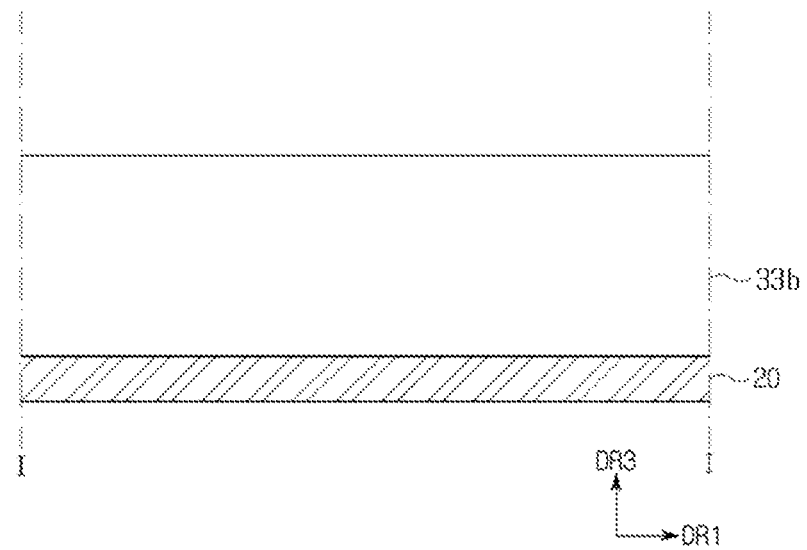
FIGS. 5 to 11 are cross-sectional views for respective processes illustrating a method for manufacturing a light path control member according to an embodiment.

First, as illustrated in FIG. 5, a light alignment polymer material layer 33b' (e.g., a light alignment layer) is formed on the substrate 20.

The light alignment polymer material layer 33b may include the light alignment polymer material before curing of the light transmission layer 33b, and the light alignment polymer material before light irradiation and curing of the first and second phase delay layers 31 and 32.

Figure 6:
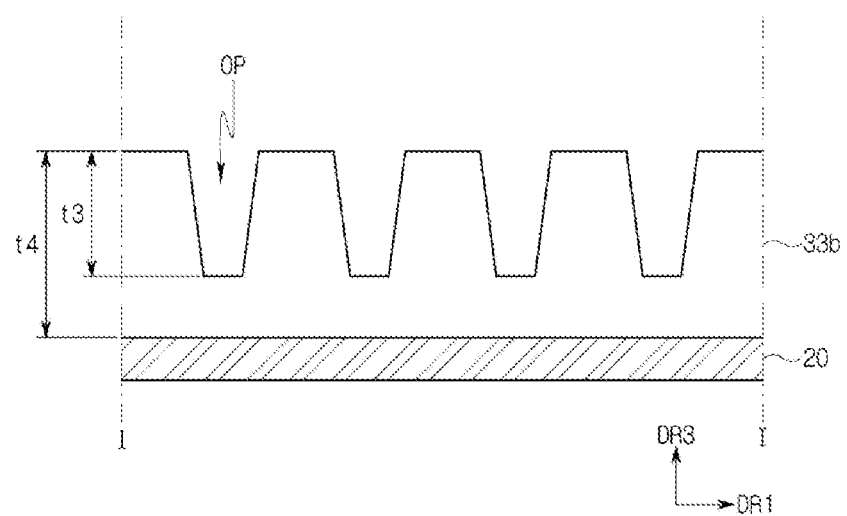

Subsequently, as illustrated in FIG. 6, a plurality of recessed grooves OP (or openings) are formed from the surface (or upper surface) of the light alignment polymeric material layer 33b" in FIG. 5.

In the forming of the plurality of recessed grooves, the height (e.g., thickness) t3 of the recessed grooves OP may be formed to be lower than the height (e.g., thickness) t4 of the light alignment polymer material layer 33b".

Figure 7:
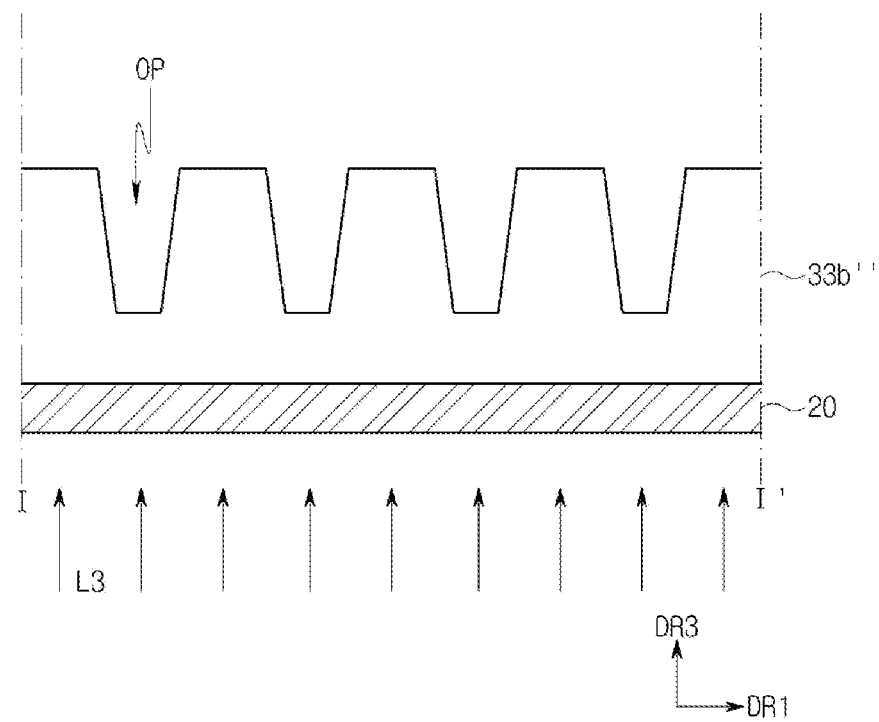
Figure 8:
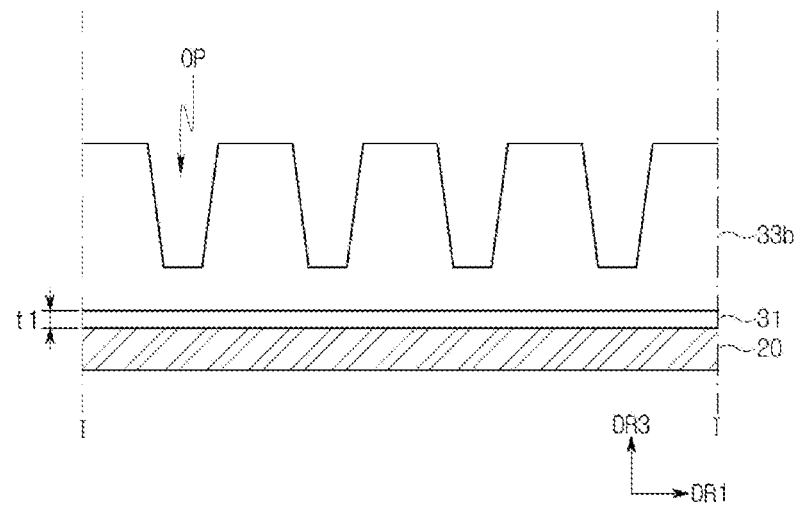

Subsequently, as illustrated in FIG. 7, the first light L3 is irradiated to the lower portion (e.g., a first portion) of the light alignment polymer material layer 33b" (or the lower portion of the substrate 20). The first light L3 may have a smaller wavelength range than that of the second light L4 to be described later. For example, the first light L3 may have a wavelength range of about 280 nm to about 320 nm. Transmittance of the light alignment polymeric material layer 33b" for the first light L3 may be less than transmittance of the light alignment polymeric material layer 33b" for the second light L4. As illustrated in FIG. 8, the first phase delay layer 31 formed directly on the substrate 20 may be formed from the light alignment polymer material layer 33b" through irradiation of the first light L3. Since the transmittance of the light alignment polymeric material layer 33b" for the first light L1 is less than the transmittance of the light alignment polymeric material layer 33b''' for the second light LA, the thickness t1 of the first phase delay layer 31 may be less than the thickness t2 of the second phase delay layer 32 to be described later. As described above, the first phase delay layer 31 may delay incident light by a first phase of $\lambda/4$. Since the first phase delay layer 31 is formed from the light alignment polymer material layer 33b" in FIG. 7, the first phase delay layer 31 and the light alignment polymer material layer 33b" in FIG. 8 may be directly contacted and integrally formed.

Figure 9:
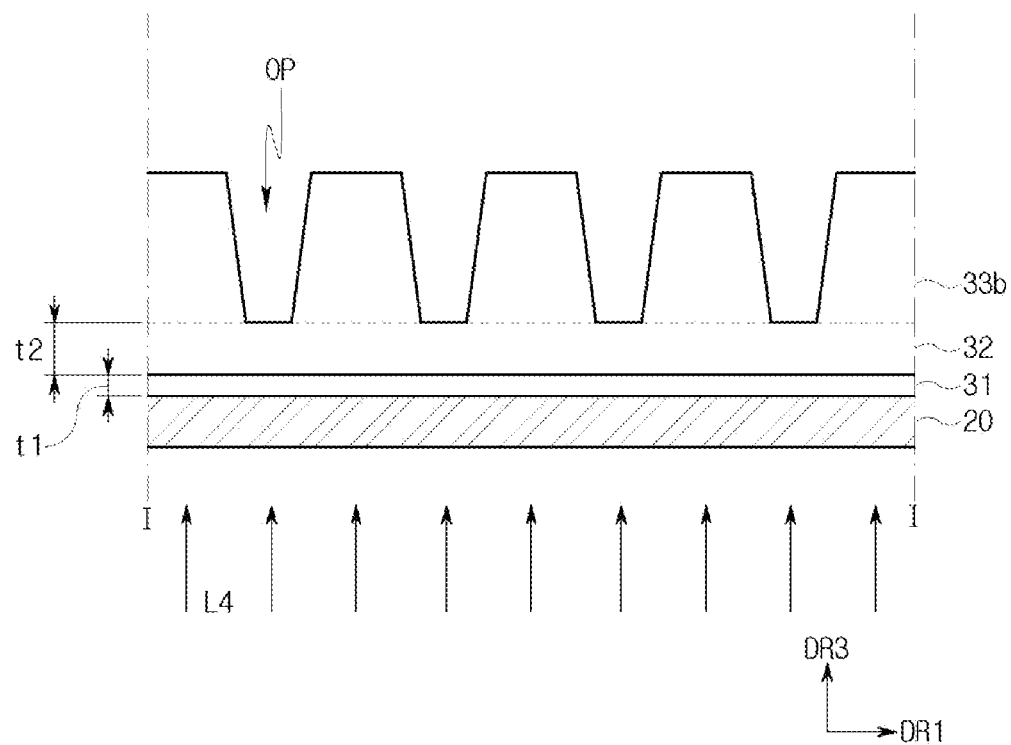

Subsequently, as illustrated in FIG. 9, the second light LA is irradiated to the lower portion (e.g., a second portion) of the light alignment polymer material layer 33b" (or the lower portion of the substrate 20). The second light LA may have a larger wavelength range than that of the first light L3 described above. For example, the second light LA may have a wavelength range of about 320 nm to about 400 nm. As illustrated in FIG. 9, the second phase delay layer 32, which is formed directly on the first phase delay layer 31 from the light alignment polymer material layer 33b" through the irradiation of the second light LA, may be formed. Since the transmittance of the light alignment polymeric material layer 33b" for the second light LA is greater than the transmittance of the light alignment polymeric material layer 33b" for the first light L3, the thickness t2 of the second phase delay layer 32 may be greater than the thickness t1 of the first phase delay layer 31 described above. As described above, the second phase delay layer 32 may delay incident light by a second phase of $\lambda/2$.

Figure 10:
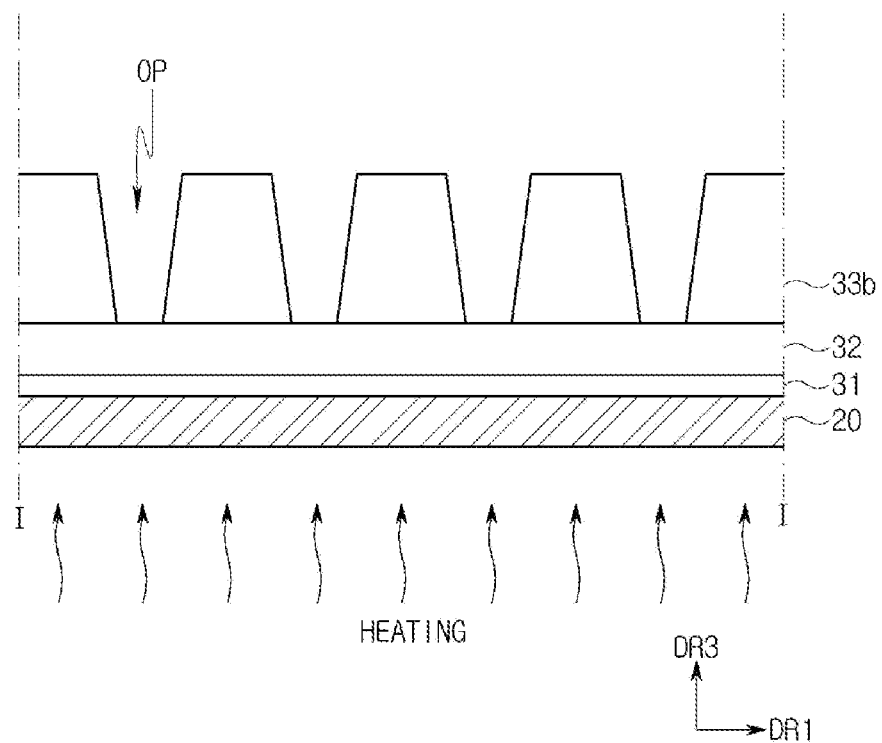

Subsequently, as illustrated in FIG. 10, the formed first and second phase delay layers 31 and 32 in FIG. 9 and the light alignment polymer material layer 33b in FIG. 9 are cured. The curing may include heating or UV curing, but is not limited thereto. The light alignment polymer material layer 33b may be a light transmission portion.

Figure 11:
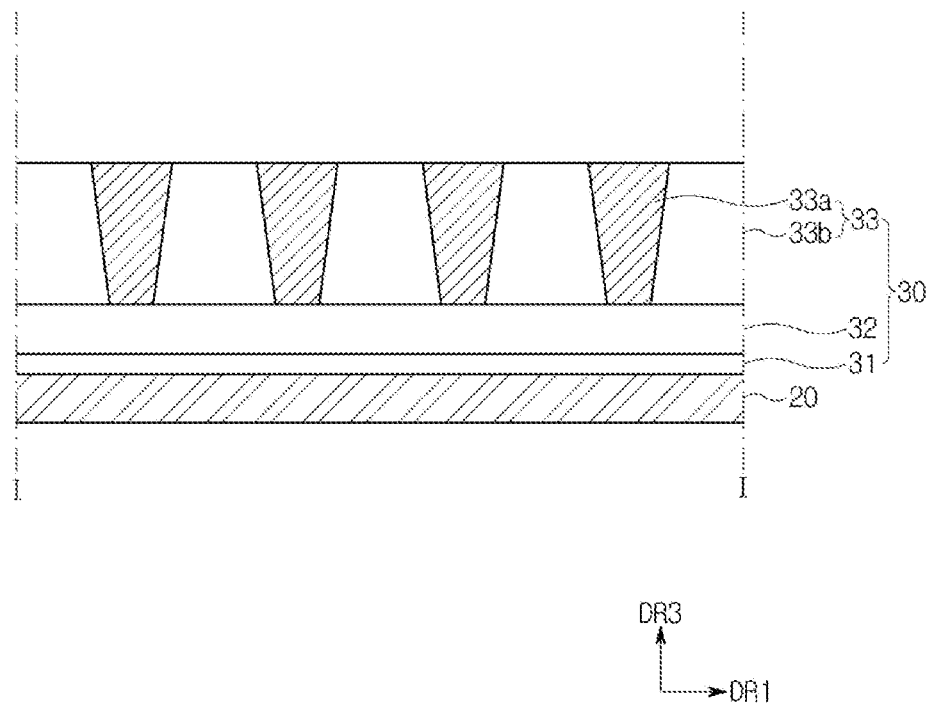

Subsequently, as illustrated in FIG. 11, the light absorption pattern 33a is formed in the opening OP of the light transmission portion 33b.

Even in the case of this embodiment, unlike the conventional method in which a polarization film (the first phase delay layer, the second phase delay layer, and the polarization layer) is attached to the viewing angle control layer as a separate coupling member, the polarization layer 50 and the phase delay layers 31 and 32 below the polarization layer 50 are spaced apart with the viewing angle control layer 33 interposed therebetween, and the first phase delay layer 31, the second phase delay layer 32, and the light transmission layer 33b are all integrally formed, so that the overall thickness of the light path control device 10 can be reduced and the process can be simplified.

Next, other embodiments of the light path control device 10 according to an embodiment will be described.

Figure 12:
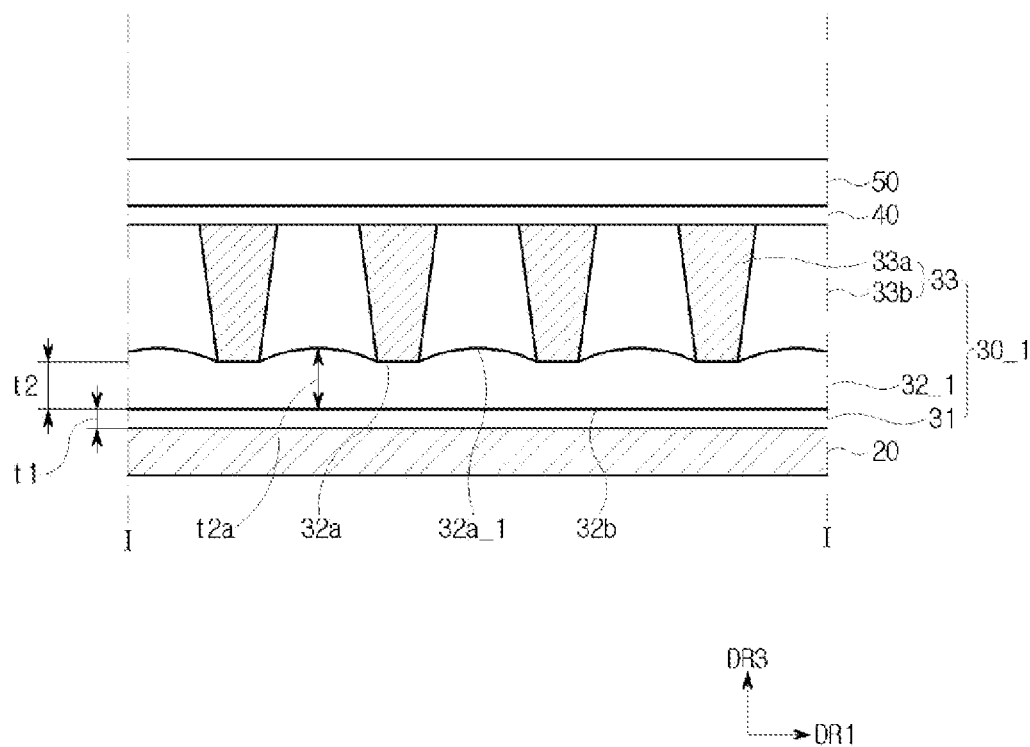
FIG. 12 is a cross-sectional view of a light path control device according to another embodiment.

FIG. 12 is a cross-sectional view of a light path control device according to another embodiment.

Referring to FIG. 12, a second phase delay layer 32_1 of a light path control unit 30_1 according to the present embodiment is different from the light path control unit 30 according to FIG. 3 in that it has an embossed shape.

More specifically, upper surfaces 32a and 32a_1 of the second phase delay layer 32_1 may include the upper surface 32a contacting the lower surface 33aa of the light absorption pattern 33a and the upper surface 32a_1 not contacting the lower surface 33aa. The surface height t2 of the upper surface 32a (or the thickness of the second phase delay layer 32_1 in a corresponding area) may be less than the surface height t2a of the upper surface 32a_1 (or the thickness of the second phase delay layer 32_1 in a corresponding area). A cross-sectional shape of the upper surface 32a_1 may include a curved shape.

In the case of the present embodiment, in the process of irradiating the second light L4 in FIG. 9, the second phase delay layer 32_1 may be formed by being further protruded unintentionally in an area that does not contact the lower surface 33aa of the light absorption pattern 33a due to the intensity of the second light L4 and the deviation of the focusing area.

Even in the case of this embodiment, unlike the conventional method in which a polarization film (the first phase delay layer, the second phase delay layer, and the polarization layer) is attached to the viewing angle control layer as a separate coupling member, the polarization layer 50 and the phase delay layers 31 and 32_1 below the polarization layer 50 are spaced apart with the viewing angle control layer 33 interposed therebetween, and the first phase delay layer 31, the second phase delay layer 32_1, and the light transmission layer 33b are all integrally formed, so that the overall thickness of the light path control device can be reduced and the process can be simplified.

Figure 13:
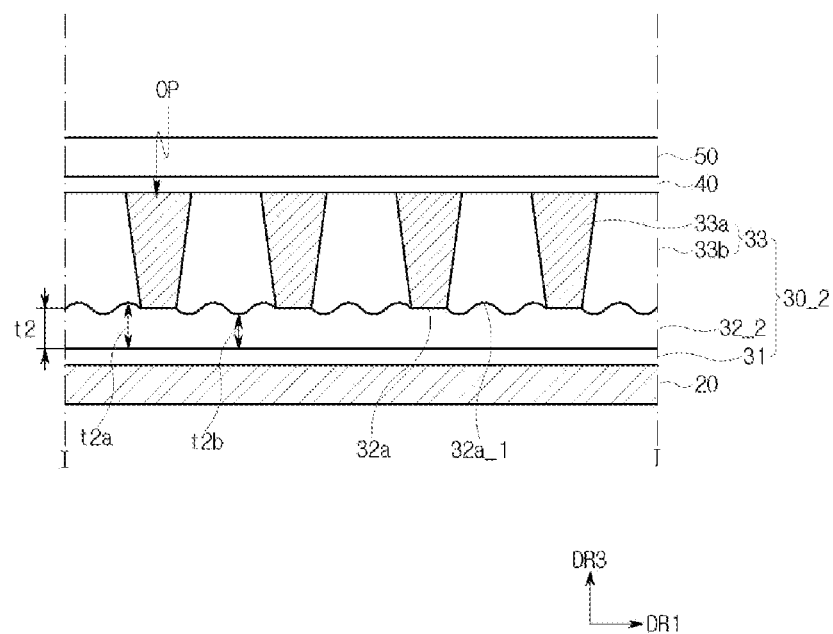
FIG. 13 is a cross-sectional view of a light path control device according to still another embodiment.

FIG. 13 is a cross-sectional view of a light path control device according to still another embodiment.

Referring to FIG. 13, an upper surface of a second phase delay layer 32_2 of a light path control unit 30_2 according to the present embodiment is different from the light path control unit 30 according to FIG. 3 in that it has surface irregularities.

More specifically, upper surfaces 32a and 32a_1 of the second phase delay layer 32_2 may include the upper surface 32a contacting the lower surface 33aa of the light absorption pattern 33a and upper surfaces 32a_1, 32a_2 not contacting the lower surface 33aa. The upper surface 32a_1 may be a concave portion, and the upper surface 32a_2 may be a convex portion. The surface height t2 of the upper surface 32a (or the thickness of the second phase delay layer 32_2 in a corresponding area) may be less than the surface height t2a of the upper surface 32a_1 (or the thickness of the second phase delay layer 32_2 in a corresponding area) and greater than the surface height t2b of the upper surface 32a_2 (or the thickness of the second phase delay layer 32_2 in a corresponding region).

In the case of the present embodiment, in the process of irradiating the second light LA in FIG. 9, the second phase delay layer 32_2 may be formed by being further protruded or recessed unintentionally in an area that does not contact the lower surface 33aa of the light absorption pattern 33a due to the intensity of the second light LA and the deviation of the focusing area.

Even in the case of this embodiment, unlike the conventional method in which a polarization film (the first phase delay layer, the second phase delay layer, and the polarization layer) is attached to the viewing angle control layer as a separate coupling member, the polarization layer 50 and the phase delay layers 31 and 32_2 below the polarization layer 50 are spaced apart with the viewing angle control layer 33 interposed therebetween, and the first phase delay layer 31, the second phase delay layer 32_2, and the light transmission layer 33b are all integrally formed, so that the overall thickness of the light path control device can be reduced and the process can be simplified.

Figure 14:
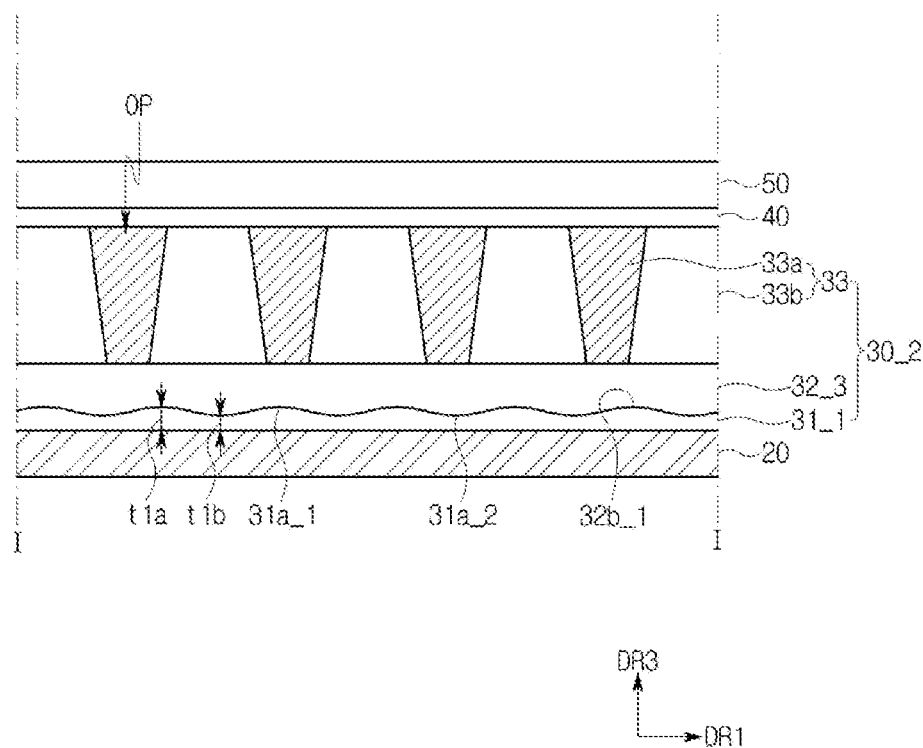
FIG. 14 is a cross-sectional view of a light path control device according to still another embodiment.

FIG. 14 is a cross-sectional view of a light path control device according to still another embodiment.

Referring to FIG. 14, an upper surface of a first phase delay layer 31_1 of a light path control unit 30_3 according to the present embodiment is different from the light path control unit 30 according to FIG. 3 in that it has surface irregularities.

More specifically, upper surfaces 31a_1 and 31a_2 of the first phase delay layer 31_1 may include surface irregularities. Although not illustrated, a flat upper surface 31a (extended parallel to the upper surface of the substrate 20 along the first direction DR1) in FIG. 3 may also be included. The upper surface 31a_1 may be a convex portion, and the upper surface 31a_2 may be a concave portion. The surface height t1a of the upper surface 31a_1 (or the thickness of the first phase delay layer 31_1 in a corresponding region) may be greater than the surface height t1b of the upper surface 31a_2 (or the thickness of the first phase delay layer 31_2 in a corresponding region), and the surface height t1b of the upper surface 31a_2 (or the thickness of the first phase delay layer 31_2 in a corresponding region) may be smaller than the surface height (t1 in FIG. 3) of the upper surface 31a.

In the case of the present embodiment, in the process of irradiating the first light L3 in FIG. 7, surface irregularities may be unintentionally formed on the upper surface of the first phase delay layer 31_1 due to the intensity of the first light L3 and the deviation in the focusing area.

Even in the case of this embodiment, unlike the conventional method in which a polarization film (the first phase delay layer, the second phase delay layer, and the polarization layer) is attached to the viewing angle control layer as a separate coupling member, the polarization layer 50 and the phase delay layers 31_1 and 32 below the polarization layer 50 are spaced apart with the viewing angle control layer 33 interposed therebetween, and the first phase delay layer 31_1, the second phase delay layer 32, and the light transmission layer 33b are all integrally formed, so that the overall thickness of the light path control device can be reduced and the process can be simplified.

Since the lower surface 32b_1 of the second phase delay layer 32_3 in FIG. 14 directly contacts the upper surfaces 31a_1 and 31a_2 of the first phase delay layer 31_1, the lower surface 32b_1 of the second phase delay layer 32_3 may have a concave portion at the convex portion of the upper surface 31a_1 of the first phase delay layer 31_1, and the lower surface 32b_1 of the second phase delay layer 32_3 may have a convex portion at the concave portion of the upper surface 31a_2 of the first phase delay layer 31_1.

Figure 15:
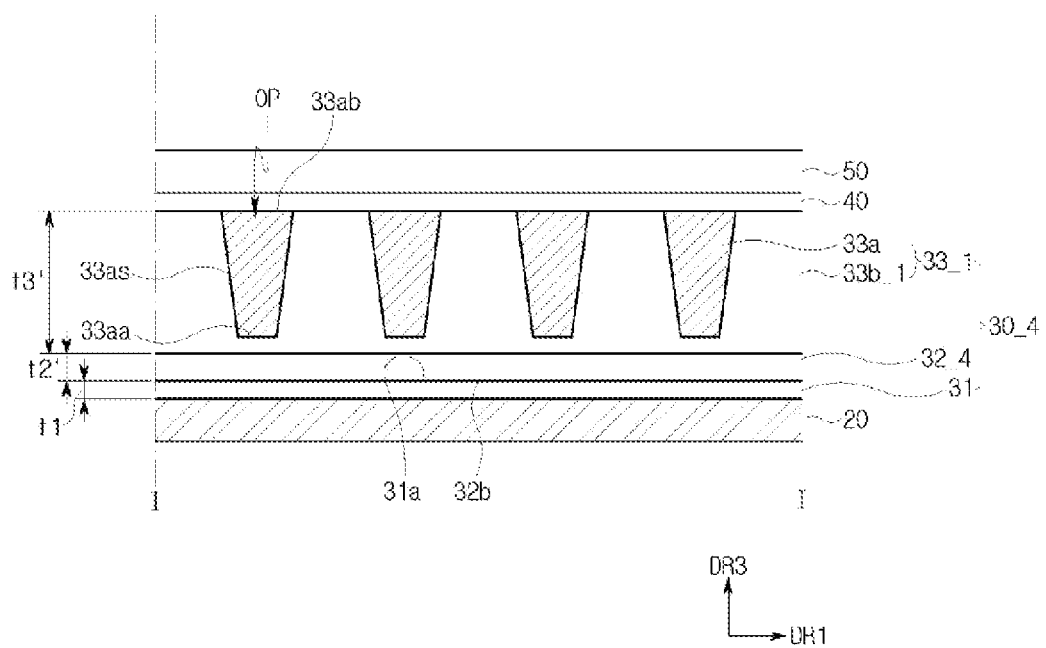
FIG. 15 is a cross-sectional view of a light path control device according to still another embodiment.

FIG. 15 is a cross-sectional view of a light path control device according to still another embodiment.

Referring to FIG. 15, a light path control unit 30_4 according to the present embodiment is different from the light path control device in FIG. 3 in that a thickness t3' of a light transmission portion 33b_1 of a viewing angle control layer 33_1 is greater than the thickness (t3 in FIG. 3) of the light absorption pattern 33a.

More specifically, the thickness t3' of the light transmission portion 33b_1 of the viewing angle control layer 33_1 of the light path control unit 30_4 according to the present embodiment may be greater than the thickness (t3 in FIG. 3) of the light absorption pattern 33a.

In the case of the present embodiment, in the process of irradiating the second light LA in FIG. 9, the second phase delay layer 32_4 may be unintentionally formed so as not to contact the lower surface 33aa of the light absorption pattern 33a due to the intensity of the second light LA and the deviation of the focusing area. Accordingly, the thickness t2' of the second phase delay layer 32_4 may be smaller than the thickness t2 of the second phase delay layer 32 in FIG.

3. The thickness t3' of the light transmitting portion 33b_1 may be greater than the thickness t3 of the light transmitting portion 33b in FIG. 3.

Even in the case of this embodiment, unlike the conventional method in which a polarization film (the first phase delay layer, the second phase delay layer, and the polarization layer) is attached to the viewing angle control layer as a separate coupling member, the polarization layer 50 and the phase delay layers 31 and 32_4 below the polarization layer 50 are spaced apart with the viewing angle control layer 33_1 interposed therebetween, and the first phase delay layer 31, the second phase delay layer 32_4, and the light transmission layer 33b_1 are all integrally formed, so that the overall thickness of the light path control device can be reduced and the process can be simplified.

Figure 16:
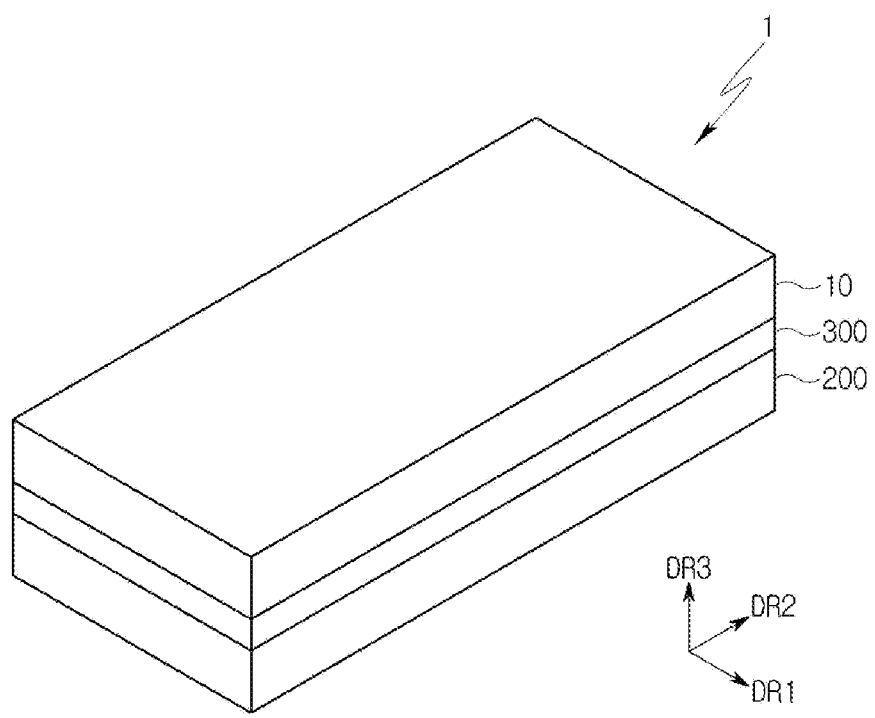
FIG. 16 is a perspective view of a display device according to an embodiment.

FIG. 16 is a perspective view of a display device according to an embodiment.

Referring to FIG. 16, a display device 1 according to an embodiment may include a display panel 200 disposed on the lower portion of the light path control device 10, a second coupling member 300 that couples the display panel 200 and the light path control device 10, and the light path control device 10 described above.

The second coupling member 300 may include any one of the materials exemplified in the first coupling member 40, but is not limited thereto.

The display panel 200 may include a plurality of pixels disposed in a display area of a base substrate and driving units disposed in a non-display area around the display area to drive the pixels. The pixels may include transistors (TFTs) connected to the driving units through a control signal line, and light emitting elements (OLEDs) connected to the transistors. The transistors are turned on or off according to a control signal applied through the control signal line to adjust the amount of current applied to the light emitting element. The light emitting element may emit light with a luminance corresponding to the amount of current applied through the transistor. The display panel 200 may further include a protective layer (Encap) encapsulating the light emitting elements (OLEDs) and an upper protective substrate (Pol). In some embodiments, the display panel 200 may be a liquid crystal display panel.

In one embodiment, the display device 1 may further include a touch panel. The touch panel may be a capacitive type touch panel or a resistive film type touch panel and can sense a user's touch input.

Although the embodiments of the disclosure have been described above with reference to the accompanying drawings, it will be understood that the technical configuration of the present disclosure may be embodied in other specific forms by those skilled in the art to which the disclosure pertains without changing the technical spirit or essential features of the disclosure. Therefore, it should be understood that the embodiments described above are illustrative in all respects and not restrictive.

DESCRIPTION OF REFERENCE NUMERALS

10: light path control device
20: substrate
30: light path control layer
40: first coupling member
50: polarization layer
1: display deice
200: display panel
300: second coupling member

What is claimed is:

1. A light path control device, comprising:
a substrate;
a first phase delay layer on the substrate, the first phase delay layer configured to delay incident light by a first phase;
a second phase delay layer on the first phase delay layer, the second phase delay layer configured to delay incident light by a second phase that is different from the first phase;
a viewing angle control layer in direct contact with the second phase delay layer, the viewing angle control layer configured to control a path of the incident light; and
a polarization layer on the viewing angle control layer.

2. The light path control device of claim 1, wherein the viewing angle control layer includes a light absorption pattern configured to absorb a portion the incident light and a light transmission layer that is around the light absorption pattern and configured to transmit a portion of the incident light.

3. The light path control device of claim 2, wherein the second phase delay layer is in contact with a lower surface of the light transmission layer.

4. The light path control device of claim 2, wherein the second phase delay layer is in contact with a lower surface of the light absorption pattern and a lower surface of the light transmission layer.

5. The light path control device of claim 4, wherein the second phase delay layer is integral with the light transmission layer.

6. The light path control device of claim 4, wherein the second phase delay layer is in direct contact with the first phase delay layer.

7. The light path control device of claim 6, wherein the first phase delay layer and the second phase delay layer are integral with each other.

8. The light path control device of claim 7, wherein the first phase delay layer includes a first upper surface facing the second phase delay layer, the first upper surface including surface irregularities.

9. The light path control device of claim 8, wherein the surface irregularities of the first upper surface are spaced apart from the lower surface of the light absorption pattern.

10. The light path control device of claim 7, wherein the second phase delay layer includes a second upper surface facing the light absorption pattern and the light transmission layer, and the second upper surface includes at least one of a convex portion or a concave portion.

11. The light path control device of claim 10, wherein the convex portion or the concave portion of the second upper surface is non-overlap with the lower surface of the light absorption pattern.

12. The light path control device of claim 2, wherein the light transmission layer includes a light alignment material, wherein the first phase delay layer and the second phase delay layer each include the light alignment material.

13. The light path control device of claim 2, wherein the light absorption pattern includes a plurality of light absorption patterns and the light transmission layer is between a pair of light absorption patterns from the plurality of light absorption patterns.

14. The light path control device of claim 1, wherein a thickness of the second phase delay layer is greater than a thickness of the first phase delay layer, the first phase is $\lambda/4$ and the second phase is $\lambda/2$.

15. A method for manufacturing a light path control device, comprising:
- forming a light alignment polymer material layer on a substrate;
- forming a plurality of recessed grooves in the light alignment polymer material layer, the plurality of recessed grooves extending from a surface of the light alignment polymer material layer;
- forming a first phase delay layer that is directly on the substrate from the light alignment polymer material layer by irradiating a first light to a lower portion of the light alignment polymer material layer;
- forming a second phase delay layer that is directly on the first phase delay layer from the light alignment polymer material layer by irradiating a second light to a lower portion of the first phase delay layer; and
- disposing a light absorption pattern in the plurality of recessed grooves of the light alignment polymer material layer.

16. The method of claim 15, wherein the plurality of recessed grooves are formed to have a thickness that is less than a thickness of the light alignment polymer material layer.

17. The method of claim 15, wherein a transmittance of the light alignment polymer material layer for the first light is less than a transmittance of the light alignment polymer material layer for the second light, wherein the first light has a wavelength range of 280 nm to 320 nm.

18. The method of claim 17, wherein the second light has a wavelength range of 320 nm to 400 nm.

19. The method of claim 15, further comprising:
- disposing a polarization layer on the light absorption pattern and the light alignment polymer material layer after disposing the light absorption pattern.

20. A display device comprising:
- a display panel configured to emit light; and
- a light path control device on the display panel and configured to control the light from the display panel, the light path control device comprising:
  - a substrate,
  - a light alignment layer including a first portion that is on the substrate and a second portion that is directly on the first portion, the first portion configured to delay incident light by a first phase and the second portion configured to delay the incident light by a second phase that is different from the first phase;
  - a viewing angle control layer on the second portion of the light alignment layer, the viewing angle control layer configured to control a path of the incident light, and
  - a polarization layer on the viewing angle control layer.

21. The display device of claim 20, wherein the first phase is $\lambda/4$ and the second phase is $\lambda/2$.

22. The display device of claim 20, wherein the second portion of the light alignment layer is in direct contact with the viewing angle control layer.

23. The display device of claim 20, wherein the first portion and the second portion of the light alignment layer comprise a light alignment polymer material.

24. The display device of claim 23, wherein the viewing angle control layer comprises the light alignment polymer material and a thickness of the viewing angle control layer is greater than a thickness of the first portion of the light alignment layer and a thickness of the second portion of the light alignment layer, and the thickness of the second portion of the light alignment layer is greater than the thickness of the first portion of the light alignment layer.

25. The display device of claim 24, wherein the viewing angle control layer includes a plurality of openings in the light alignment polymer material of the viewing angle control layer, the plurality of openings filled with a light absorption material configured to absorb the incident light and the light alignment polymer material of the viewing angle control layer configured to transmit the incident light.

26. The display device of claim 25, wherein the second portion of the light alignment layer is in contact with the light absorption material and the light alignment polymer material of the viewing angle control layer or the second portion of the light alignment layer is in contact with the light alignment polymer material of the viewing angle control layer but is not in contact with the light absorption material.

27. The display device of claim 20, wherein an upper surface of the second portion of the light alignment layer includes at least one of a concave portion or a convex portion.

28. The display device of claim 20, wherein an upper surface of the first portion of the light alignment layer includes at least one of a concave portion or a convex portion.

* * * * *